(12) United States Patent
Nandy et al.

(10) Patent No.: US 12,211,275 B1
(45) Date of Patent: Jan. 28, 2025

(54) LOW-LATENCY SPOTLIGHTING

(71) Applicant: Amazon Technologies, Inc., Seattle, WA (US)

(72) Inventors: Kaustav Nandy, Bengaluru (IN); Lokesh Amarnath Ravindranathan, Bangalore (IN); Shivam Agarwal, Agra (IN); Yash Pandya, Navi Mumbai (IN); Imran Khan, Bangalore (IN); Manivel Sethu, Bangalore (IN); Abhinav Aggarwal, New Delhi (IN)

(73) Assignee: Amazon Technologies, Inc., Seattle, WA (US)

( * ) Notice: Subject to any disclaimer, the term of this patent is extended or adjusted under 35 U.S.C. 154(b) by 305 days.

(21) Appl. No.: 17/657,302

(22) Filed: Mar. 30, 2022

(51) Int. Cl.
*G06V 20/40* (2022.01)

(52) U.S. Cl.
CPC .............. *G06V 20/42* (2022.01); *G06V 20/46* (2022.01); *G06V 20/49* (2022.01)

(58) Field of Classification Search
CPC ......... G06V 20/42; G06V 20/46; G06V 20/49
See application file for complete search history.

(56) References Cited

U.S. PATENT DOCUMENTS

| | | | |
|---|---|---|---|
| 9,740,956 B2 * | 8/2017 | Chen | G06T 7/12 |
| 2009/0262137 A1 | 10/2009 | Walker et al. | |
| 2014/0169663 A1 * | 6/2014 | Han | G06V 10/50 |
| | | | 382/165 |
| 2016/0269615 A1 | 9/2016 | Deng et al. | |
| 2017/0287135 A1 * | 10/2017 | Pozos | G06T 7/73 |
| 2018/0260960 A1 | 9/2018 | Crivelli et al. | |
| 2019/0332893 A1 * | 10/2019 | Roy Chowdhury | G06F 18/2163 |
| 2020/0035019 A1 | 1/2020 | Cappello et al. | |
| 2021/0168416 A1 | 6/2021 | Weiner et al. | |
| 2022/0053245 A1 | 2/2022 | Guez et al. | |
| 2023/0033533 A1 * | 2/2023 | Kaniyala | G06T 7/251 |

OTHER PUBLICATIONS

U.S. Appl. No. 17/305,127, Inventors Ravindranathan et al., filed Jun. 30, 2021.
U.S Advisory Action dated Apr. 25, 2023 in U.S. Appl. No. 17/305,127.
U.S. Final office Action dated Jan. 20, 2023 in U.S. Appl. No. 17/305,127.

(Continued)

*Primary Examiner* — Brandon J Miller
(74) *Attorney, Agent, or Firm* — Weaver Austin Villeneuve & Sampson LLP

(57) ABSTRACT

Techniques for reducing the latency of annotating a replay video segment may include receiving a video segment with content involving multiple individuals. An annotation task is performed concurrently with a tracking task. The annotation task receives annotation data to indicate which of the individuals is an individual of interest in a subset of frames of the video segment, and the tracking task tracks the individuals in the video segment by generating bounding objects corresponding to the individuals. The annotation data can be associated with the bounding objects to detect a bounding object for the individual of interest, and a visualization emphasis object is generated based on the detected bounding object in a replay video segment to identify the individual of interest.

21 Claims, 7 Drawing Sheets

(56) References Cited

OTHER PUBLICATIONS

U.S. Final Office Action dated Dec. 12, 2023 in U.S. Appl. No. 17/305,127.
U.S. Non-Final office Action dated Jul. 11, 2022 in U.S. Appl. No. 17/305,127.
U.S. Non-Final Office Action dated Mar. 28, 2024 in U.S. Appl. No. 17/305,127.
U.S. Non-Final Office Action dated May 25, 2023 in U.S. Appl. No. 17/305,127.
U.S. Notice of Allowance dated Sep. 23, 2024 in U.S. Appl. No. 17/305,127.

* cited by examiner

LOW-LATENCY SPOTLIGHTING

BACKGROUND

When viewing video content with multiple individuals moving round, it can be difficult for viewers to follow a specific individual of interest. For example, in a video stream of a sporting event, it can be difficult for the viewers to quickly identify a player who has possession of the ball. Manual annotation can be added to the video stream to generate a replay clip to highlight the ball carrier. However, such manual editing process can be time consuming, and may not be suitable for instant replay due to the latency of the editing process.

BRIEF DESCRIPTION OF THE DRAWINGS

Various embodiments in accordance with the present disclosure will be described with reference to the drawings, in which.

DETAILED DESCRIPTION

Figure 1:
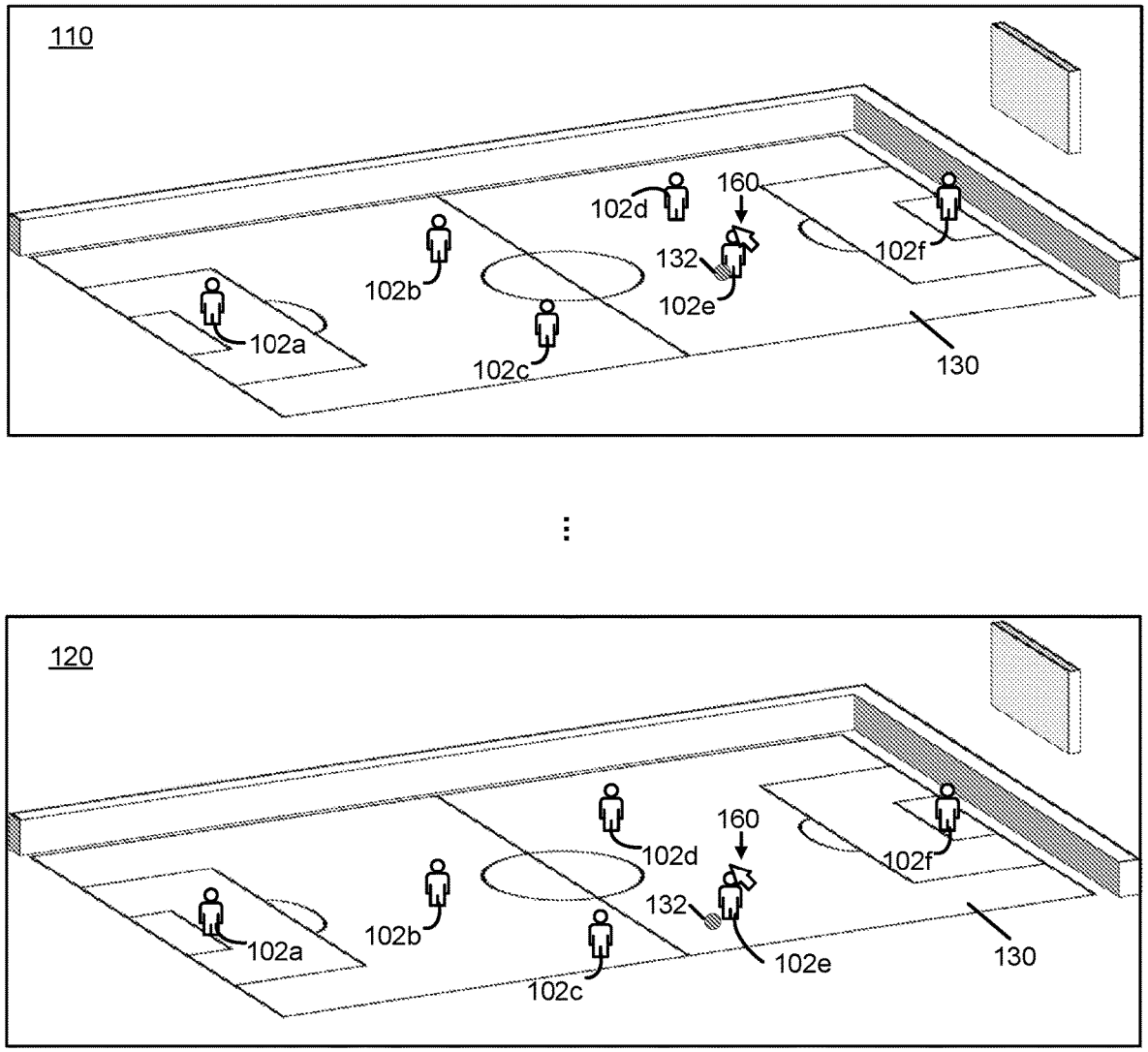
FIG. 1 illustrates example frames from a video segment being annotated, according to certain aspects of the disclosure.

Computer vision annotation tools (CVAT) can be used to improve the latency of the annotation process. For example, a tracking task using object detection and recognition can identify and track individuals in the video content. For a sporting event, players can be distinguished from fans and other people by determining which individuals are on a field of play and/or by other indications such as individuals having sports equipment or individuals wearing similar uniforms. Bounding boxes can be generated for individuals detected in the video content, and a video segment with the bounding boxes around the individuals can be displayed on a user interface. As part of the annotation task, an annotator or operator can then select the bounding box corresponding to the individual of interest such as the ball carrier in selected frames (e.g., by clicking on the bounding box), and a visualization emphasis object can be placed on or near the bounding box to spotlight the corresponding individual in a replay clip.

Although such techniques can be used to spotlight an individual of interest in a replay clip, the process can still take many minutes for to complete. For instant replay of live events, this latency may degrade the viewer experience. For example, other significant plays may have already transpired before the replay clip is ready, causing the viewer to lose interest in the replay clip. Furthermore, the selection of a bounding box by an annotator can lead to inaccurate results because some clicks may not overlap any bounding box, or some clicks may overlap with multiple bounding boxes causing ambiguity as to which individual should be spotlighted.

To further reduce the annotation latency and to improve the accuracy of the annotation process, the techniques disclosed herein perform the annotation task concurrently with the tracking task such that the annotation task can be initiated without having to wait until the tracking task completes. For example, when a video segment of a live or prerecorded event is obtained, an annotation task can be performed on the raw video segment without any bounding boxes while the tracking task is performed in parallel to generate the bounding boxes. A merging step is subsequently performed to associate the annotation data with the bounding boxes to detect the bounding box for the individual of interest, and to generate a visualization emphasis object to spotlight the individua of interest based on the detected bounding box.

In some implementations, a 2-stage annotation process can be employed to allow an annotator to adjust the visualization emphasis object. For example, following the first stage of annotating the individual of interest, a preview of the video segment with the visualization emphasis object can be displayed on a user interface. The annotator or operator may then adjust a size or location of the visualization emphasis object in the second stage of annotation. This provides the operator with an opportunity to correct any inaccuracies with the visualization emphasis object generation. Even with the 2-stage annotation process, a 30-50% reduction in latency can be achieved as compared to the approach of performing the annotation task after the detection task. The end result is a faster and more accurate annotation of a video segment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

To illustrate the annotation techniques of the present disclosure, an example of a video segment depicting a sporting event will be used. It should be understood that the annotation techniques can also be applied to videos with other types of content to spotlight individuals of interest.

FIG. 1 illustrates frames 110 and 120 of a video segment of a sporting event. As shown in FIG. 1, the video segment may involve players 102a to 102f on a playing field 130 competing to take possession of a play object 132 such as a ball. The video segment can be obtained from a video source such as a live broadcast of the event or from a prerecorded video. The video segment can be obtained by a CVAT tool to allow an annotator or an operator to add annotation to the video segment to generate a replay video clip. Upon receiving the video segment, multiple computer vision tasks such as a player annotation task and a player tracking task can be executed on the video segment in parallel.

Execution of the player annotation task may include displaying the video segment or selected frames such as frames 110 and 120 sequentially from the video segment on a CVAT user interface. Frames 110 and 120 can be separated by a certain frame interval in the video segment. For instance, frame 110 can be spaced apart by five or more frames from frame 120. In other words, if frame 110 is frame #1 in the video segment, then frame 120 can be, for example, frame #6 in the video segment. An annotator viewing frame 110 may place a cursor 160 or other types of pointer at a player to select that player as the player of interest (e.g., by clicking on the player of interest). The player of interest can be player 102e in possession of the play object (referred to as the play object carrier or the ball carrier). In some implementations, a specific part of the player is used to select the player of interest. The specific part of the player can be, for example, at the top of the player such as the head or helmet of the player. Hence, the annotator is tasked with clicking on the head or helmet of the ball carrier. The CVAT receives the annotation input (e.g., the clicks on the head or helmet) to indicate which of the players 102a to 102f is the play object carrier in possession of the play object in frame 110 of the video segment.

It should be noted that the term play object carrier does not necessary require the player to be physically carrying the play object. The term play object carrier can refer to the player in possession of the play object in the context of the sporting event. Hence, as shown in FIG. 1, the play object carrier can be a player who is in control of kicking a soccer ball even though the player is not physically carrying the ball. It should also be noted a play object is not limited to a ball. For example, a play object can also be a puck, or other object that changes possession during the course of a game.

A similar process can be repeated for frame 120 to select the player of interest (e.g., ball carrier) in frame 120. As mentioned above, frames 110 and 120 can be a few frames apart. Hence, the annotation input selecting the player of interest need not be for every frame of the video segment, but can instead be for a subset of the frames of the video segment such as every $n^{th}$ frame of the video segment. In some implementations, the frame interval can be a configurable parameter that is adjusted depending on the nature of the sporting event. By way of example, for fast paced sports on a crowded field, the frame interval can be set to a smaller value such that annotation inputs are received more frequently. For slower paced sports or sports in which players are spread apart, the frame interval can be set to a larger value such that annotation inputs are received less frequently.

Figure 2:
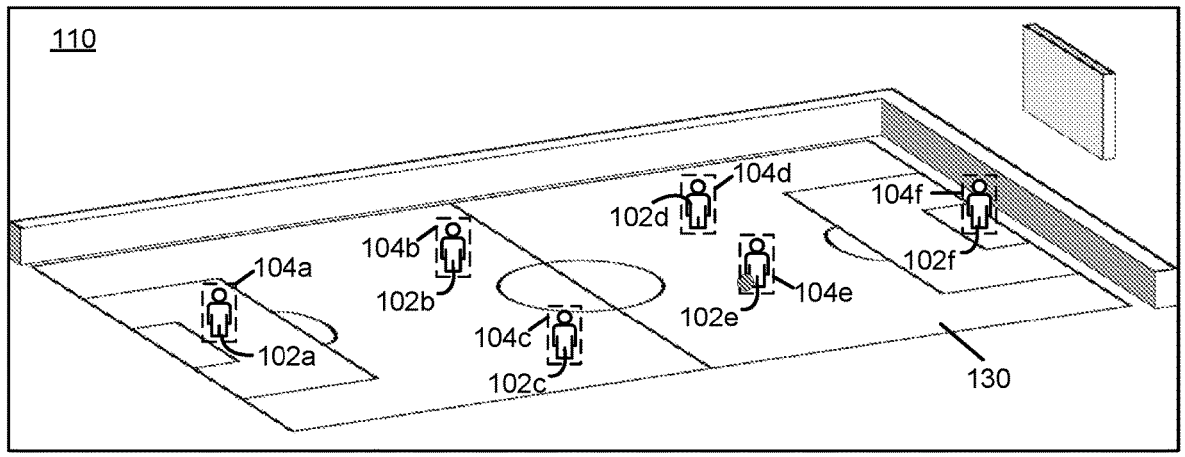
FIG. 2 illustrates example frames from a video segment being processed by a tracking module according to certain aspects of the disclosure.
Figure 2:
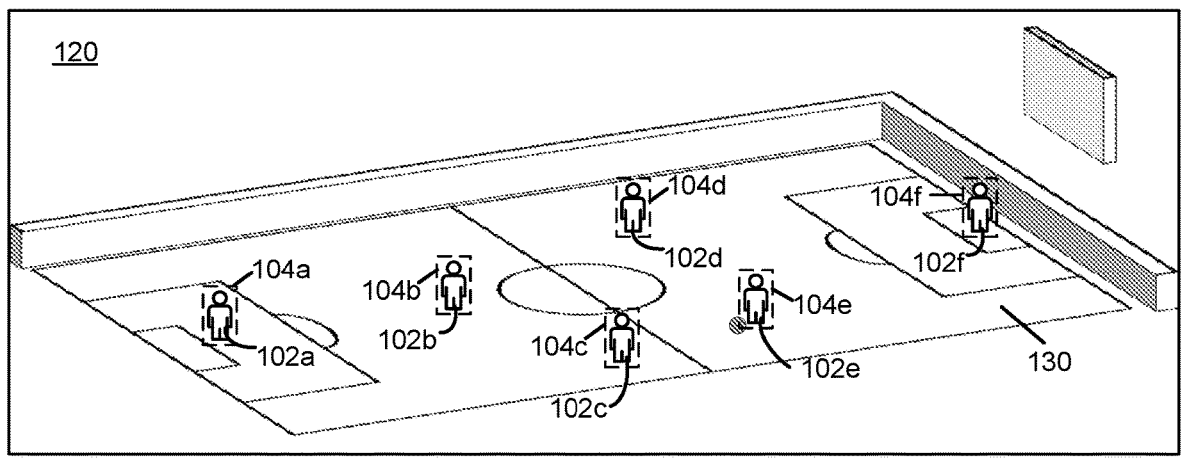

FIG. 2 illustrates execution of the player tracking task on frames 110 and 120 of the video segment. The player tracking task may employ object recognition and detection techniques to detect the players 102a to 102f on the playing field 130. For example, computer vision machine learning techniques such as multi-object tracking (MOT) can be used to identify the individual players 102a to 102f (e.g., based on the individuals being on playing field 130, wearing a certain team uniform, etc.) in each frame, and track the movement of the detected players 102a to 102f in the video segment. For each of the detected players 102a to 102f, a bounding object such as a bound box is generated to outline the corresponding player. The size of the bounding box can be generated, for example, to surround the entire body of the individual. Referring to FIG. 2, bounding boxes 104a to 104f can be generated to outline players 102a to 102f, respectively. The bounding boxes 104a to 104f can be generated for each frame of the video segment including frames 110 and 120.

It should be noted that the player tracking task is performed in parallel or concurrently with the player annotation task of FIG. 1. For example, the player tracking task can be performed in the background while the CVAT user interface is displaying the frames of the video segment to receive annotation input from the operator. Hence, the two tasks can be initiated at the same time in response to obtaining the video segment to annotate.

In some implementations, a field segmentation task can also be performed in parallel with the player annotation task and the player tracking task. The field segmentation task is used to identify pixels belonging to the playing field 130 in each frame of the video segment to differentiate the playing field 130 from pixels of other objects (e.g., background, fans, players, referees, play object such as a ball, etc.). This information can be used by a subsequent video blending step to generate a visualization emphasis object (e.g., an ellipse spotlight) that is grounded to the playing field 130. The field segmentation task can employ segmentation techniques such as edge detection by examining the similarity of color, intensity, and/or texture of local adjacent pixels.

Figure 3:
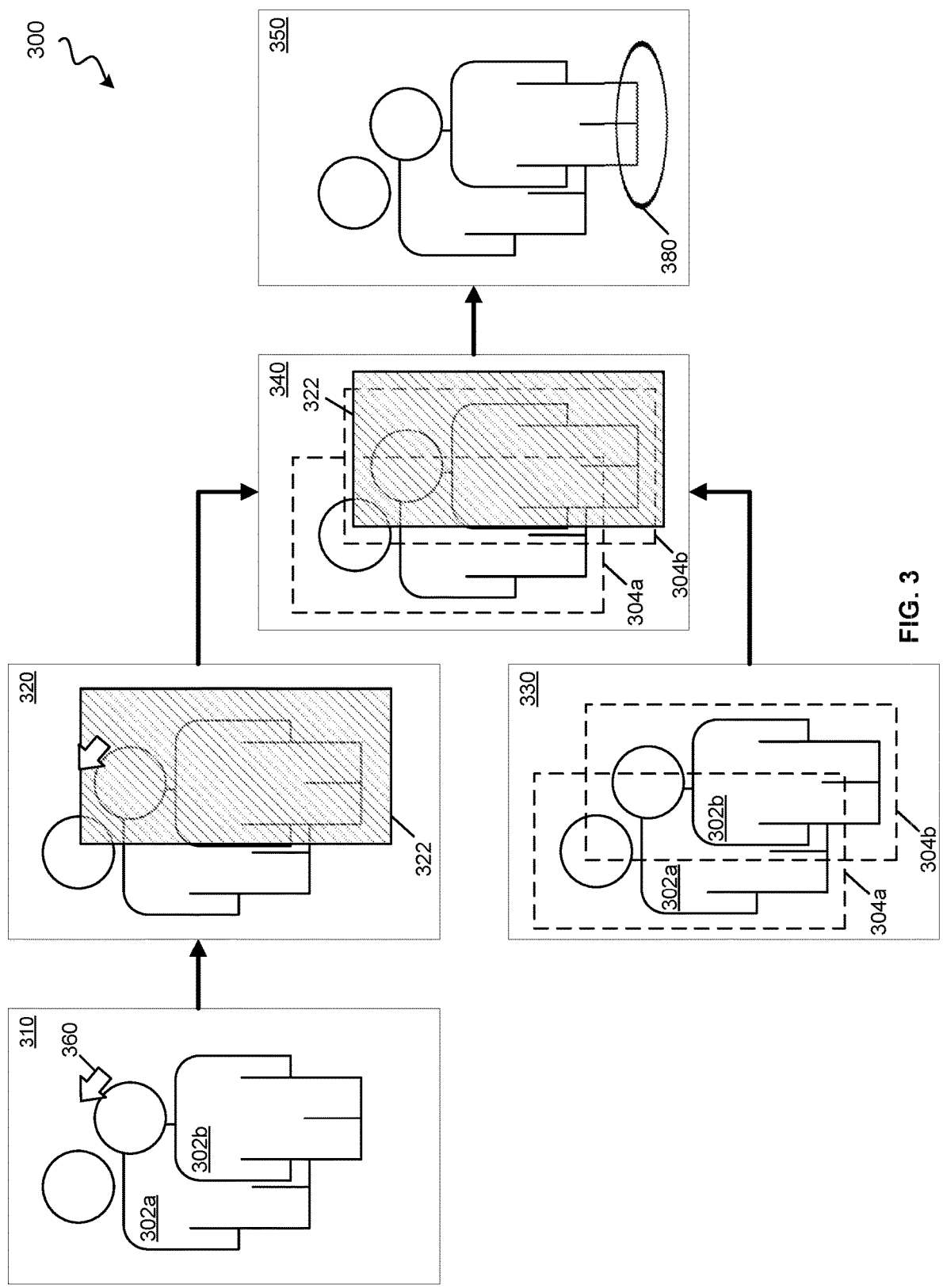
FIG. 3 illustrates an example of a data merging process according to certain aspects of the disclosure.

Upon completion of the player annotation task and player tracking task, the player tracking data from the player tracking task can be merged with the player annotation data from the player annotation task to generate a visualization emphasis object identifying the play object carrier. FIG. 3 shows an example of the data merging process 300 to associate the annotation data with the player tracking data to detect the bounding object for the player of interest (e.g., play object carrier). For case of explanation, the data merging process is illustrated using a pixel block of a frame that contains two players 302a and 302b. Pixel block 310 represents the annotator interaction with the frame to select the player of interest 302b by clicking or selecting the top of player 302b (e.g., head or helmet of player 302b) using a pointer 360 on the CVAT user interface. The coordinates of the pointer selection are recorded to indicate the position of the player of interest in the frame.

Referring to pixel block 320, a dummy bounding object such as a dummy bounding box 322 is generated using the coordinates of the pointer selection. For example, if the annotator is expected to click the top of the player of interest (near the head or helmet), a dummy bounding box can be generated by using the x-y coordinates of the click as the midpoint of the top edge of the dummy bounding box 322. The dummy bounding box can be generated according to an estimation of the height and width of the player. The size estimation can be based on the average bounding box size of the bounding boxes generated for the players in the same frame.

Pixel block 330 illustrates an example of the result of the tracking task, which generates bounding box 304a for player 302a and bounding box 304b for player 302b. In this example, players 302a and 302b are in close proximity to each other in the frame. As such, there is significant overlap between bounding boxes 304a and 304b.

Referring to pixel block 340, the dummy bound box 322 is superimposed on the two bounding boxes 304a and 304b. If the dummy bound box 322 overlaps with more than one bounding box as in the example shown, a determination is made as to which bounding box has the maximum overlap with the dummy bounding box. The maximum overlap is also compared with a threshold percentage (e.g., 30%) to ensure that the pointer selection indicating the player of interest can be correlated with a bounding box generated from the player tracking task in the frame. The bounding box with the maximum overlap that is above the threshold is detected as the bounding box for the player of interest (referred to as the detected bounding box). In the example shown, bounding box 304b has the maximum overlap with dummy bounding box 322, and the amount of overlap is above the threshold. As such, bounding box 304b is the detected bounding box for the player of interest (player 302a). In scenarios in which the maximum overlap is below the threshold, or the dummy bounding box does not have any overlap with the bounding boxes generated from the player tracking task, the dummy bounding box can be used as the detected bounding box for the player of interest.

Refer to pixel block 350, upon determining the detected bounding box, a visualization emphasis object such as ellipse 380 is generated for the player of interest (e.g., play object carrier). For example, visualization emphasis object can be generated at the base of the player of interest. The detected bounding box for the player of interest can be used as a guide for placement of the visualization emphasis object. The visualization emphasis object can have a dimension that is proportional to a dimension of the detected bounding object. For example, the major axis of ellipse 380 can be set to have a certain ratio with the height of the detected bounding box 304b.

The data merging process 300 can be performed for each frame of the video segment that received the annotation input identifying the player of interest. For frames in between these frames that do not have any annotation input (e.g., frames in between every $n^{th}$ frame), an extrapolation of the dummy bounding box can be performed using the frames that received the annotation input. In other words, suppose the annotation input was received on the $1^{st}$ frame and the $6^{th}$ frame of the video segment. The dummy bounding box generated for the $1^{st}$ frame is extrapolated to the dummy bounding box generated for the $6^{th}$ frame to fill in the dummy bounding boxes for the frames in between. The extrapolation can be, for example, a linear extrapolation from the source dummy bounding box to the target dummy bounding box. The linear extrapolation from the source to the target can be divided into equally spaced intervals for the number of frames in between, and the data merging process 300 can be performed for those frames using their respective extrapolated dummy bounding box.

In some implementations, a visualization annotation task can be executed to allow the annotator to view a preview of the video segment with the generated visualization emphasis object, and to make adjustments to the generated visualization emphasis object. This additional annotation task can be referred to as the second stage annotation. A preview of the visualization emphasis object on one or more frames of the video segment can be displayed on the CVAT user interface. The annotator may adjust the location, and/or a dimension of the visualization annotation task to enlarge or shrink the visualization. For instance, when the visualization emphasis object is an ellipse 380, the dimension being adjusted can be a major axis and/or a minor axis of the ellipse. This second stage annotation allows the annotator to fine tune the visualization to create an optimal viewing experience.

The adjustment input received in a frame to modify the visualization emphasis object can be interpolated and smoothed to the preceding and subsequent frames, and the results can be displayed for the annotator to preview. This preview can be a close resemblance to the final replay video segment that a viewer may see, and provides an immediate feedback to the annotator as to how the visualization emphasis object will be displayed in the replay video segment.

In some implementations, upon generation of the visualization emphasis objects in the video segment subject to any adjustments, a blending function can be performed on the visualization annotation data from the visualization annotation task (e.g., size and location of the visualization emphasis objects) and the field segmentation data from the field segmentation task. The blending function can determine which pixel of the playing field should be modified into the visualization emphasis object such that the visualization emphasis object appears to be grounded to the field of play. For example, a pixel belonging to a player on the field that is at the location covered by the visualization emphasis object will not be modified such that the player appears to be on top of the visualization emphasis object. The blending function also smooths out the frame transitions of the visualization emphasis object. Accordingly, a replay video segment that spotlights a player of interest can be generated by overlaying a visualization emphasis object with the playing field.

Figure 4:
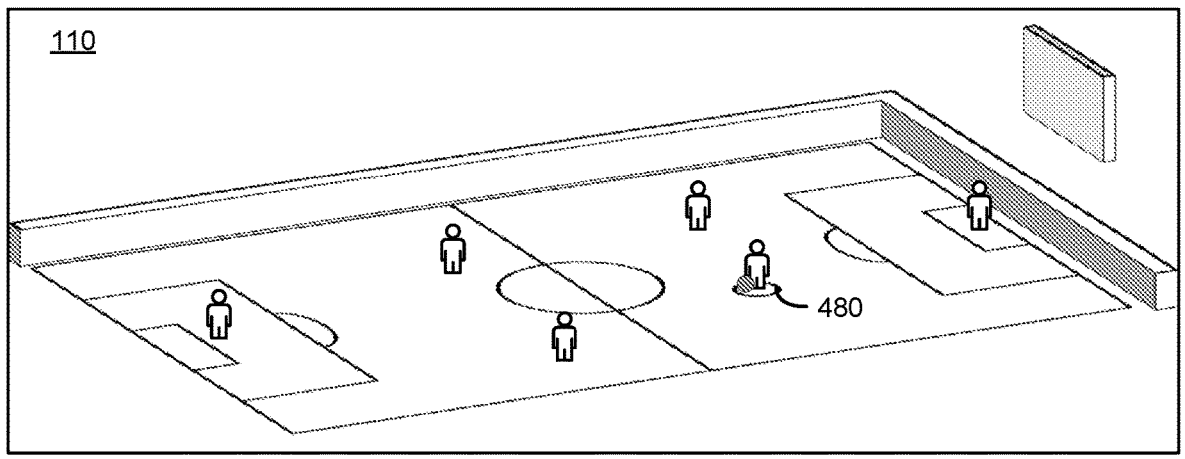
FIG. 4 illustrates example frames from a replay video segment enhanced with a visualization emphasis object according to certain aspects of the disclosure.
Figure 4:
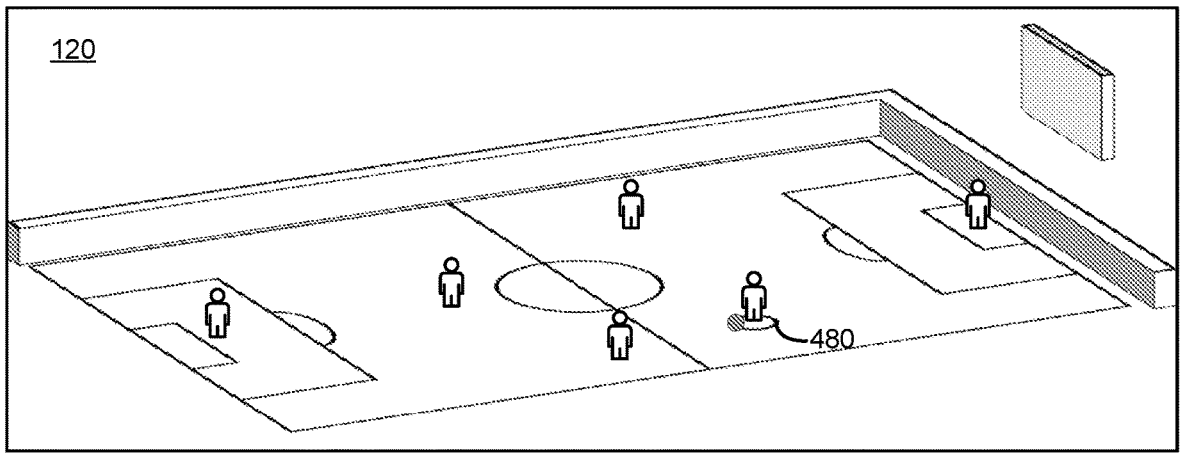

FIG. 4 illustrates a result of the blending the visualization annotation data and the field segmentation data to generate the visualization emphasis object in frames 110 and 120 of the video segment. As shown in FIG. 4, the visualization emphasis object 480 can be generated at the base of the ball carrier to spotlight that player. The visualization emphasis object 480 appears to be grounded on the playing field for an optimal viewing experience. It should be understood that the techniques disclosed herein can also be used to generate the visualization emphasis at other locations to highlight the player of interest. In some implementations, the replay video segment as it will be seen by an end-user can be displayed for a final verification step. In some implementations, a different operator than the annotator can verify the quality of the replay vide segment. The system may transmit the replay video segment to media presentation services for delivery to the end-user upon receiving verification to release the replay video segment.

Figure 5:
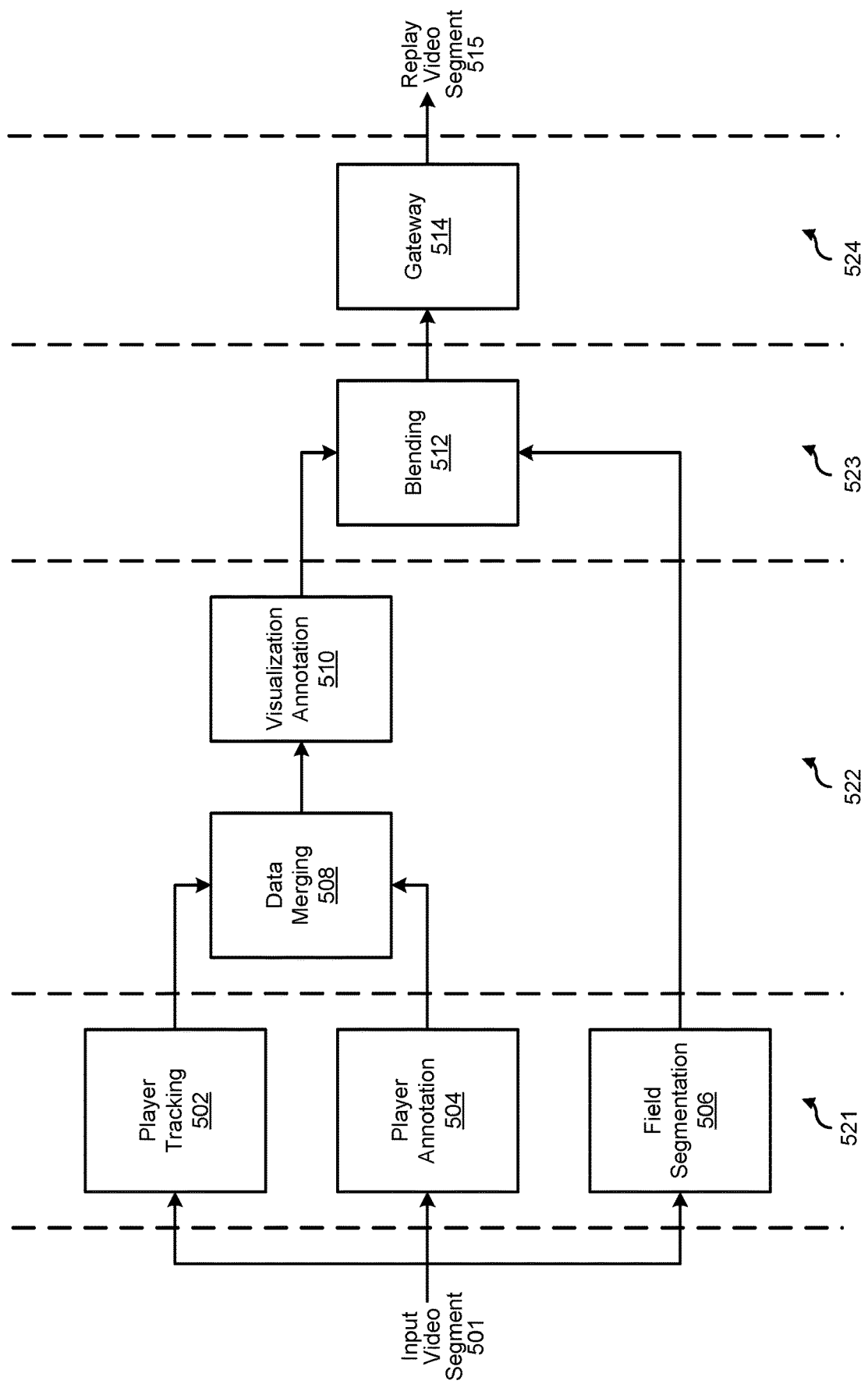
FIG. 5 illustrates an example of a visualization emphasis system according to certain aspects of the disclosure.

FIG. 5 illustrates a conceptual diagram of a visualization emphasis system 500. Processes that are performed concurrently are arranged to align vertically in FIG. 5 to highlight the execution parallelism. The visualization emphasis system 500 may include media presentation services (not shown) to provide video segments that can be enhanced with player visualization emphasis features. The video segments may include input video segment 501. By way of example, the media presentation services may include X-ray Media Services of Prime Video provided by Amazon.com of Seattle, Washington. The input video segment 501 can be processed by the player tracking module 502, the player annotation module 504, and the field segmentation module 506 concurrently.

The player tracking module 502 is operable to perform player detection based on Computer Vision (CV) based multi object tracking (MOT) of all the players visible in each frame of the input video segment 501. In some implementations, the tracking operations performed by the player tracking module 502 may use a deep-learning based algorithm referred to as DeepSORT (SORT: Simple Real time Tracker). In some implementations, the detecting operations performed by the player tracking module 502 can be based on Common Objects in Context (COCO) datasets. COCO is a large-scale object detection, segmentation, and captioning dataset, and images in the dataset may be everyday objects captured from everyday scenes. The detection operations can be trained using YOLO v3 model (YOLO: You Only Look Once). In some implementations, the COCO dataset can be finetuned using a custom dataset for a particular sporting event such as, for example, soccer or football. The player tracking module 502 may use motion and appearance features extracted from the bounding boxes to perform frame by frame data association and track generation.

The player annotation module 504 is operable to receive annotation input from an annotator or an operator to indicate a player of interest (e.g., play object carrier) in the input video segment 501. For example, the input video segment 501 can be displayed on a CVAT user interface, and the annotator can click on the user interface to select a player of interest in a subset of frames of the input video segment 501. For example, the subset of frames can be every $n^{th}$ frame of the input video segment 501. Selection of the player of interest can be performed by clicking on a specific part of the player, such as the head or helmet, or another body part of the player of interest. The player annotation module 504 can be referred to as the stage-1 or first stage annotation. It should be noted that the input video segment 501 used by the player annotation module 504 has not undergone the player tracking processing. In other words, player tracking module 502 and player annotation module 504 can operate on the same input video segment 501 concurrently to increase parallel execution and reduce processing latency.

The field segmentation module 506 is operable to identify the pixels associated with the playing field. The field segmentation module 506 can operate with visualization artifacts, and use texture and color-based techniques to perform a pixel level field segmentation. The pixel level field segmentation allows the visualization emphasis object to be generated on the field surface pixels. Other pixels that belong to players, officials, or other objects on the playing field can remain unchanged when rendering. In some implementations, a gaussian mixture model can be used. The field segmentation for a single frame may include image size reduction which reduces image size to a smaller size such that the operations can be computationally efficient while still capturing the unique color distribution and texture features of the playing field. The field segmentation may further include entropy-based texture filtering and Otsu thresholding to create a rough estimate of the field surface based on texture, color conversion which converts the pixels to CIELab color space (color space as defined by the International Commission on Illumination for measuring object colors-colors where distances have a perceptual meaning), and color-based segmentation which uses a Gaussian Mixture Model (GMM). The number of clusters used can be based on accuracy and efficiency constraints. Using larger number of clusters may result in a larger convergence time for the Expectation Maximization (E-M) algorithm used to train the GMM. The field segmentation may combine texture and color-based segmentations to identify the color clusters which have intersection with the texture-based field segmentation, and field pixel identification which use pixels from the previously identified color labels as field pixels.

Data generated by the field segmentation module 506 can be used to determine how to place the visualization emphasis object on the player of interest. In some implementations, the field segmentation module 506 can extract the static graphics components present in the broadcast stream such as, for example, score boards and logos. This can be performed based on an assumption that the pixels associated with those static graphics components don't change as much as other pixels. The extracted static graphics components can be used to identify areas that the visualization emphasis object may not be allowed to overlay. In some implementations, the field segmentation module 506 can be implemented using deep learning-based methods involving semantic segmentation models such as Mask R-CNN (regional convolutional neural network) and DeepLabv3. As shown in FIG. 5, the player tracking module 502, the player annotation module 504, and the field segmentation module 506 can be executed in parallel during a first time interval 521.

The data merging module 508 associates the tracking data from player tracking module 502 and the annotation data from player annotation module 504. The data merging module 508 allows the player tracking and the player annotation to be performed in parallel. In some implementations, the output data of the player tracking module can be in a XML format and includes data indicating the position of the bounding boxes of each player in each frame of the input video segment 501. The output data of the player annotation module 504 can also be in a XML format, and includes data indicating the coordinates of the clicks received in a subset of frames of the input vide segment 501 indicating the selection of a player of interest.

The data merging module 508 then detects a bounding box for the player of interest, for example, using the technique described with reference to FIG. 3. For instance, a dummy bounding box can be generated based on the coordinates of the annotation data, and the dummy bounding box is correlated with a bounding box from the tracking data to detect the bounding box for the player of interest based on a maximum overlap area. In some scenarios, the detected bounding box can be the dummy bounding box if the maximum overlap area is less than a threshold percentage or if there is no overlapping bounding box. A visualization emphasis object can then be generated for the detected bounding box of the player of interest. For example, the visualization emphasis object can be an ellipse generated at the base of the detected bound box, and may have a major axis proportional to the height of the detected bounding box. It should also be noted that more than one player can be annotated as a player of interest in a frame. In such implementations, multiple dummy bounding boxes can be generated (one for each player of interest), and each dummy bounding box can be correlated with a bounding box from the tracking data.

The visualization annotation module 510 is operable to receive annotation input from an annotator or an operator to adjust an attribute of the generated visualization emphasis object. For example, a preview of the replay video segment with the generated visualization emphasis object can be displayed on a CVAT user interface, and the annotator can adjust a dimension or a location of the visualization emphasis object on the user interface. The visualization annotation module 510 can be referred to as the stage-2 or second stage annotation. The visualization annotation module 510 allows the visualization emphasis object to be finetuned and optimized for end-user viewing experience. In some implementations, processing by the data merging module 508 and the visualization annotation module 510 may occur during a second time interval 522 as shown in FIG. 5.

The blending module 512 is operable to overlay the visualization emphasis object on the field pixels as determined from the field segmentation module 506. In some implementations, the blending module 506 may receive a location of a center of the visualization emphasis object, a height of the detected bounding box, and parameter(s) that can be used to scale the size of the visualization emphasis object with respect to the height of the detected bounding box, or to offset the center of the visualization emphasis object from the detected bounding box. Such parameters can be obtained from the visualization annotation module 510 in response to the adjustments made by the operator. The blending module 512 can blend the visualization emphasis object on the field surface for jitter removal and smoothing. In some implementations, a Savitzky-Golay filtering can be used for noise reduction along with an exponential smoothing. The blending of the visualization emphasis object can be made directly onto each of the frames of the replay video segment. The blending module 512 may generate the visualization emphasis object (e.g., an ellipse) in a color that contrasts the color of the field surface. The blending module 512 may also use a perspective transformation such as, for example, homography transformation, from the field coordinates to the image coordinates so that the visualization emphasis object may appear to be realistic on the field surface. In some implementations, the processing performed by the blending module 512 may occur during a third time interval 523.

In some implementations, a gateway module 514 can be implemented to allow final verification and approval of the replay video segment 515 during a fourth time interval 534 before the replay video segment 515 is released to the media presentation services. For example, the replay video segment 515 as it will be seen by the end-user can be displayed on a user interface for an operator to verify the quality of the segment. Upon receiving approval from the operator, the replay video segment 515 may then be encoded (e.g., according to suitable video and/or audio codecs) transmitted to the media presentation services, and be presented as an option for playback with the visualization emphasis features. In some implementations, the gateway module 514 can be omitted, and the processing of the blending module 512 can be performed during the second time interval 522, and the encoding of the replay video segment 515 can be performed during the third time interval 523 before being provided to the media presentation services.

Figure 6:
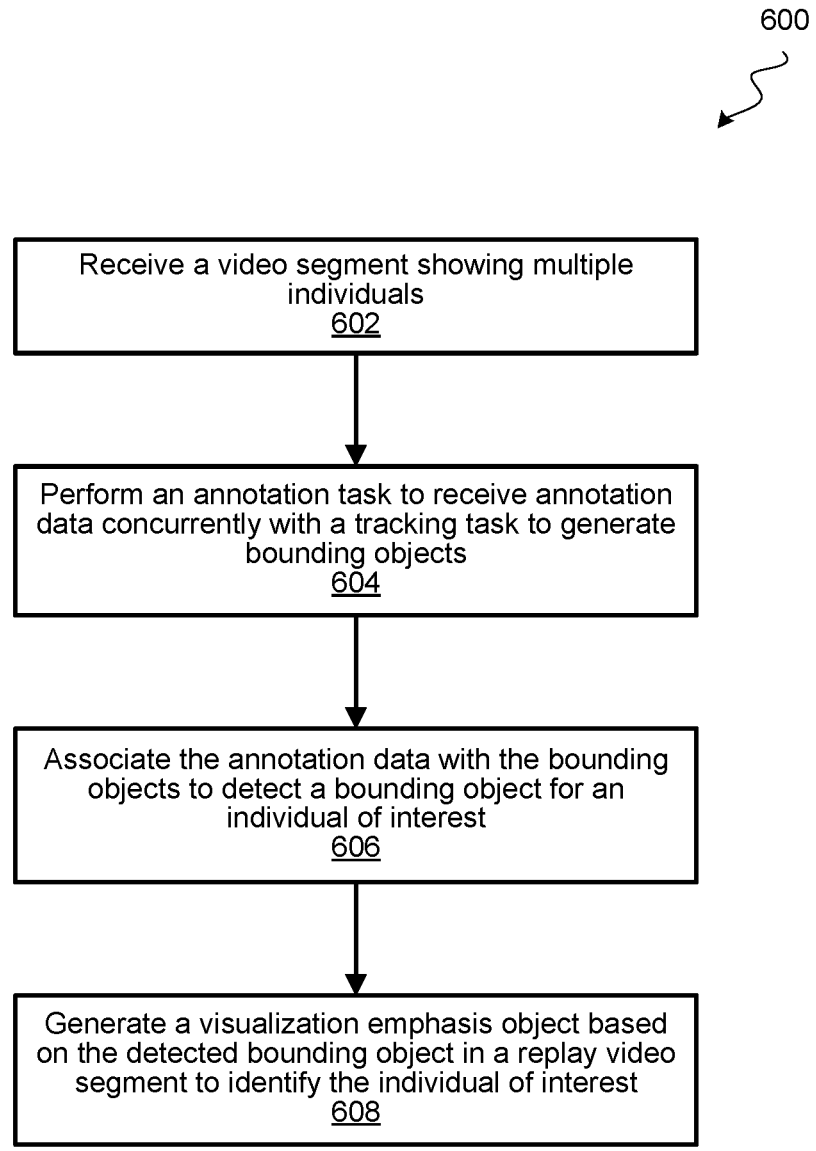
FIG. 6 illustrates an example of a flow diagram of a process to generate a replay video segment according to certain aspects of the disclosure.

FIG. 6 illustrates a flow diagram of an example of a process 600 for generating a replay video segment using the techniques disclosed herein. Process 600 can be performed, for example, by a computing system having one or more processors, and a memory storing instructions implementing process 600. The computing system can be used, for example, to implement a visualization emphasis system such as visualization emphasis system 500. In some implementations, process 600 can be implemented on a computer-readable medium that is executable by one or more processors of a computing system to generate a replay video segment.

Process 600 may begin at block 602 by receiving a video segment showing multiple individuals. The video segment can be received from media presentation services, and can be a live or prerecorded video. In some implementations, the video segment may include content from a sporting event. The multiple individuals can be, for example, players interacting on a playing field. The players may compete to take possession of a play object such as a ball.

At block 604, an annotation task can be performed concurrently with a tracking task to reduce the processing latency of generating the replay video segment. The tracking task can be performed to track the individuals in the video segment by generating bounding objects corresponding to the individuals in the video segment. The annotation task can be performed to receive annotation data to indicate which of the individuals is an individual of interest in a subset of frames of the video segment. The subset of frames can be every $n^{th}$ (e.g., $6^{th}$) frame of the video segment. The individual of interest can be a player of interest such as a play object carrier (e.g., ball carrier). The annotation data may include coordinates (x-y coordinates) identifying a specific part of the individual of interest in each frame of the subset of frames of the video segment. For example, the specific part of the individual of interest can be at the top of the individual of interest such as the head, cap, or helmet of the individual, although other parts of the individual can be used. The coordinates can be received, for example, by having an annotator click on the specific part of the individual of interest on a user interface.

At block 606, the annotation data is associated or merged with the bounding objects to detect a bounding object for the individual of interest. For example, a dummy bounding object can be generated based on the coordinates identifying the specific part of the individual of interest in a frame, and a determination can be made as to which bounding objects in the frame has a maximum overlap with the dummy bounding object. The maximum overlap can be compared with a threshold percentage. If the maximum overlap is greater than the threshold, the bounding object with the maximum overlap can be selected as the detected bounding object for the individual of interest. If the maximum overlap is less than the threshold, the dummy bounding object can be selected as the detected bounding object for the individual of interest. Dummy bounding objects can then be extrapolated in frames of the video segment that did not receive the annotation data.

At block 608, a visualization emphasis object is generated in a replay video segment based on the detected bounding object to identify the individual of interest. The visualization emphasis object can be in the form of an ellipse or other suitable shape. The visualization emphasis object can be generated at the base of the individual of interest, or at another location or position at or near the individual of interest to spotlight that individual. In some implementations, the visualization emphasis object may have a dimension that is proportional to a dimension of the detected bounding object. For example, the major axis of the ellipse can be proportional to the height of the detected bounding box. In some implementations, adjustment data can be received from an operator to adjust an attribute of the visualization emphasis object. The attribute can be a dimension (e.g., major axis, minor axis) or a location of the visualization emphasis object. In some implementations, the replay video segment including the adjusted visualization emphasis object can be displayed as a preview, and the replay video segment can be transmitted to media presentation services in response to receiving verification from an operator to release the replay video segment. The media presentation services may then provide the replay video segment to users of the media presentations services, for example, by playing the replay video segment on a client display device.

Figure 7:
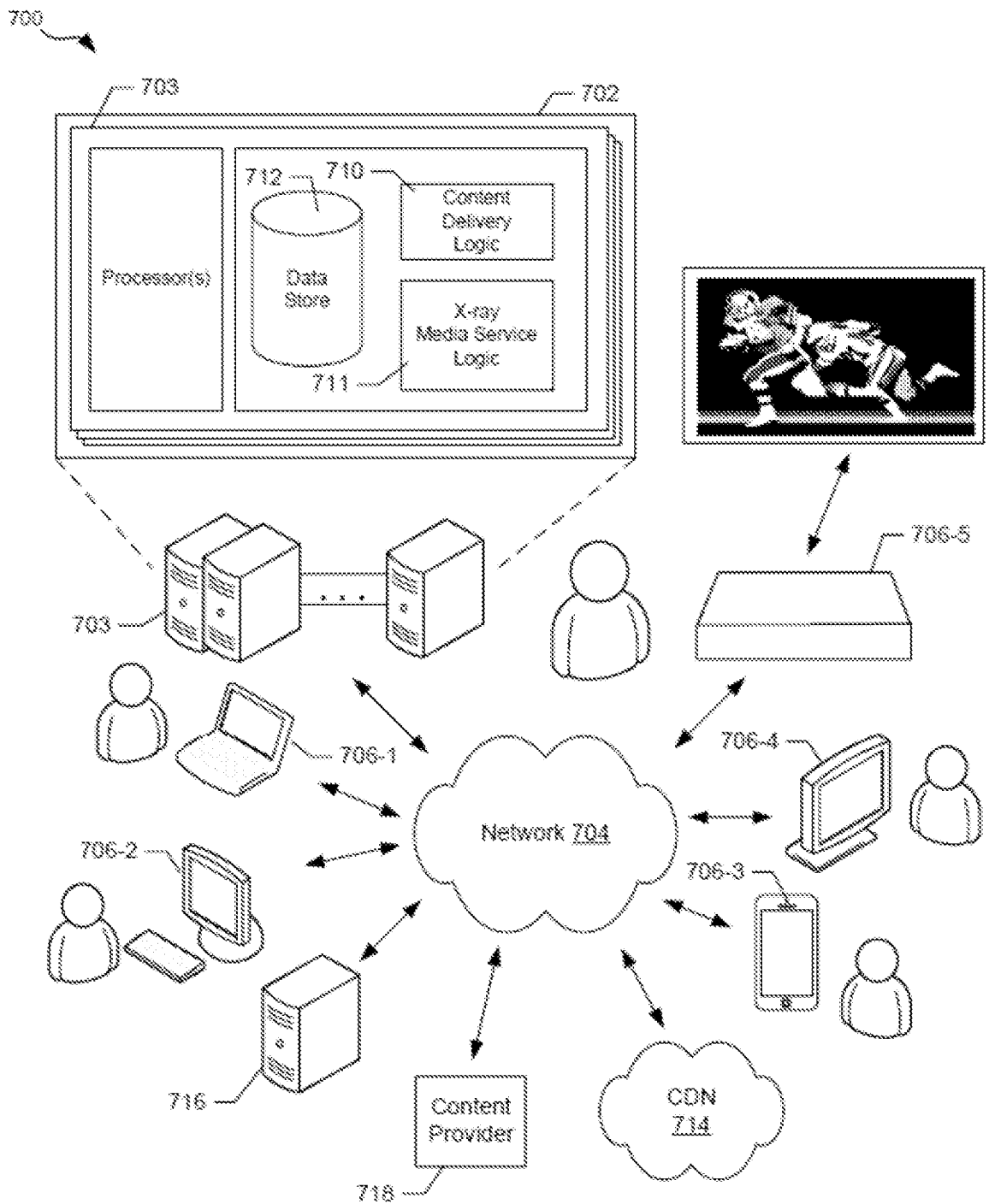
FIG. 7 illustrates an example of a computing system according to certain aspects of the disclosure.

FIG. 7 illustrates an example of a computing environment 700 that may be used with some implementations. Computing environment 700 may include a video content service 702 that provides video content via network 704 to a variety of client devices (706-1 through 706-5) in accordance with the techniques described herein. The video content may include live or broadcast content or video-on-demand (VOD) content. In various implementations, the video content may be a video presentation of a live event (e.g., a livestream, broadcast, and/or camera feed of an ongoing live event and/or a recording of a partially or fully-completed event which may also be referred to as formerly-live event). Content service 702 may conform to any of a wide variety of architectures such as, for example, a services platform deployed at one or more co-locations, each implemented with one or more servers 703. Network 704 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 706 may be any suitable device capable of connecting to network 704 and consuming content provided by service 702. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 702. Alternatively, such resources may be independent of content service 702, e.g., on a platform under control of a separate provider of computing resources with which content service 702 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 702 is described as if it is integrated with the platform(s) that provides both broadcast content and VOD-style content to client devices. However, it should be understood that content service 702 may provide access to content in conjunction with one or more content delivery networks (e.g., CDN 714) that may or may not be independent of content service 702. In addition, the source(s) of one or both of the broadcast and VOD-style content may or may not be independent of content service 702 (e.g., as represented by content provider server 716, and live content provider 718). The range of variations known to those of skill in the art are contemplated to be within the scope of this disclosure.

Some of the implementations enabled by the present disclosure contemplate logic resident on the client devices consuming video content from content service 702; such logic might be configured to handle, for example, requesting smaller chunks of subtitle files. Such logic might be part of an existing algorithm or module on the client device or implemented to work in conjunction with such an algorithm or module.

It should also be noted that implementations are contemplated in which, in addition to content delivery logic 710 (which facilitates various aspects of content delivery to client devices 706), content service 702 may include other types of logic, e.g., X-ray media service logic 711 that facilitates providing additional material such as bonus content for video content. For example, the bonus content may include video clips that include blended visualization emphasis objects for players in sporting events. Although the X-ray media service logic 711 is shown to be associated with the content service 702, it may be possible that the X-ray media service logic 711 is associated with the content service 702 and/or a third-party service.

In addition to providing access to video content, content service 702 may also include a variety of information related to the video content (e.g., non-burned-in subtitle information, and other associated metadata and manifests in data store 712 to which service 702 provides access). Alternatively, such information associated with and/or about the content, as well as the content itself may be provided and/or hosted by one or more separate platforms, e.g., CDN 714. It should be noted that, while logic 710 and 711, and data store 712 are shown as integrated with content service 702, implementations are contemplated in which some or all of these operate remotely from the associated content service, and/or are under the control of an independent entity. From these examples, those of skill in the art will understand the diversity of use cases to which the techniques described herein are applicable.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 5 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method, comprising:
   receiving a video segment of a sporting event involving players on a playing field taking possession of a play object;
   executing a plurality of computer vision tasks on the video segment in parallel, the plurality of computer vision tasks including:
      a player tracking task to track the players in the video segment;
      a player annotation task to receive player annotation input to indicate which of the players is a play object carrier in possession of the play object in the video segment; and
      a field segmentation task to identify pixels belonging to the playing field in the video segment;
   merging player tracking data from the player tracking task with player annotation data from the player annotation task to generate a visualization emphasis object identifying the play object carrier;
   executing a visualization annotation task to receive visualization annotation input to adjust a size or a location of the visualization emphasis object;
   blending visualization annotation data from the visualization annotation task with field segmentation data from the field segmentation task to generate a replay video segment that overlays the adjusted visualization emphasis object with the playing field; and
   transmitting the replay video segment to a media presentation service.

2. The computer-implemented method of claim 1, wherein the player annotation input identifies a specific part of the play object carrier in a subset of frames of the video segment.

3. The computer-implemented method of claim 1, wherein the player tracking data includes bounding boxes providing outlines of corresponding players, and wherein merging the player tracking data with the player annotation data includes identifying which bounding box belongs to the play object carrier.

4. The computer-implemented method of claim 1, wherein the visualization emphasis object is generated at a base of the play object carrier.

5. A computer-implemented method, comprising:
   receiving a video segment showing a plurality of individuals;
   performing an annotation task concurrently with a tracking task, wherein the annotation task receives annotation data to indicate which of the individuals is an individual of interest in a subset of frames of the video segment, and the tracking task tracks the individuals in the video segment by generating bounding objects corresponding to the individuals;
   associating the annotation data with the bounding objects to detect a bounding object for the individual of interest;
   generating a visualization emphasis object based on the detected bounding object in a replay video segment to identify the individual of interest;
   displaying the replay video segment;
   receiving verification to release the replay video segment; and
   transmitting the replay video segment to a media presentation service.

6. The computer-implemented method of claim 5, wherein the annotation data includes coordinates identifying a specific part of the individual of interest in each of a subset of frames of the video segment.

7. The computer-implemented method of claim 6, wherein the specific part of the individual of interest is at the top of the individual of interest.

8. The computer-implemented method of claim 6, wherein associating the annotation data with the bounding objects includes:
   generating a dummy bounding object based on the coordinates identifying a specific part of the individual of interest in a frame; and
   determining which bounding objects in the frame has a maximum overlap with the dummy bounding object.

9. The computer-implemented method of claim 8, wherein associating the annotation data with the bounding objects further includes:
   determining that the maximum overlap is greater than a threshold; and
   selecting the bounding object with the maximum overlap as the detected bounding object.

10. The computer-implemented method of claim 8, wherein associating the annotation data with the bounding objects further includes:
    determining that the maximum overlap is less than a threshold; and
    selecting the dummy bounding object as the detected bounding object.

11. The computer-implemented method of claim 8, wherein associating the annotation data with the bounding objects further includes extrapolation dummy bounding objects in frames that did not receive the annotation data.

12. The computer-implemented method of claim 5, wherein the visualization emphasis object is generated at a base of the individual of interest.

13. The computer-implemented method of claim 5, wherein the visualization emphasis object has a dimension that is proportional to a dimension of the detected bounding object.

14. The computer-implemented method of claim 5, further comprising receiving adjustment data to adjust an attribute of the visualization emphasis object.

15. The computer-implemented method of claim 14, wherein the attribute is a dimension or a location of the visualization emphasis object.

16. The computer-implemented method of claim 14, further comprising generating a preview of the replay video segment by interpolating the adjusted visualization emphasis object.

17. The computer-implemented method of claim 5, further comprising performing a field segmentation task to identify pixels belonging to a playing field in the video segment.

18. A computing system comprising:
one or more processors;
a memory coupled to the one or more processors and storing instructions, which when executed by the one or more processors, cause the computing system to perform operations including:
receiving a video segment showing a plurality of individuals;
performing an annotation task concurrently with a tracking task, wherein the annotation task receives annotation data to indicate which of the individuals is an individual of interest in a subset of frames of the video segment, and the tracking task tracks the individuals in the video segment by generating bounding objects corresponding to the individuals;
associating the annotation data with the bounding objects to detect a bounding object for the individual of interest by:
generating a dummy bounding object based on the annotation data identifying a specific part of the individual of interest in a frame; and
determining which bounding objects in the frame has a maximum overlap with the dummy bounding object; and
generating a visualization emphasis object based on the detected bounding object in a replay video segment to identify the individual of interest.

19. The computing system of claim 18, wherein associating the annotation data with the bounding objects further includes:
determining that the maximum overlap is greater than a threshold; and
selecting the bounding object with the maximum overlap as the detected bounding object.

20. The computing system of claim 18, wherein associating the annotation data with the bounding objects further includes:
determining that the maximum overlap is less than a threshold; and
selecting the dummy bounding object as the detected bounding object.

21. The computer-implemented method of claim 17, wherein the field segmentation task is performed concurrently with the annotation task.

* * * * *